(12) United States Patent
Kerins et al.

(10) Patent No.: US 12,039,301 B2
(45) Date of Patent: Jul. 16, 2024

(54) DEVELOPMENT AND IMPLEMENTATION OF CONTAINERIZED APPLICATIONS

(71) Applicant: Royal Bank of Canada, Toronto (CA)

(72) Inventors: Ian Kerins, Toronto (CA); Benny Derick Marianayagam, Toronto (CA); Parth Sondarva, Toronto (CA); Sahil Bhardwaj, Georgetown (CA); Yasamin Ahmadzadeh, London (CA); Navpreet Kaur, Toronto (CA); Michael David Webster, Brampton (CA); Biren H Parmar, Burlington (CA); Juan Carlos Chang Zheng, Markham (CA); Jong Ming Char, Toronto (CA); Chi Kit Yim, Aurora (CA); Harpreet Singh, Brampton (CA)

(73) Assignee: Royal Bank of Canada, Toronto (CA)

( * ) Notice: Subject to any disclaimer, the term of this patent is extended or adjusted under 35 U.S.C. 154(b) by 189 days.

(21) Appl. No.: 17/815,973

(22) Filed: Jul. 29, 2022

(65) Prior Publication Data

US 2024/0036833 A1 Feb. 1, 2024

(51) Int. Cl.
*G06F 8/36* (2018.01)
*G06F 8/10* (2018.01)
*G06F 8/60* (2018.01)

(52) U.S. Cl.
CPC ............... *G06F 8/36* (2013.01); *G06F 8/10* (2013.01); *G06F 8/60* (2013.01)

(58) Field of Classification Search
None
See application file for complete search history.

(56) References Cited

U.S. PATENT DOCUMENTS 10,482,169 B2 * 11/2019 Singh .................... G06F 40/131
11,765,098 B1 * 9/2023 Kallakuri .............. H04L 47/762
                                                                                      709/226

(Continued)

OTHER PUBLICATIONS

Ibrahim et al., "Managing Quality Assurance Challenges of DevOps through Analytics," ACM, 2019, 5pg. (Year: 2019).*

(Continued)

*Primary Examiner* — Ryan D. Coyer

(57) ABSTRACT

A method for developing a containerized application using a pipeline platform consisting of a plurality of stages with associated development tools, the method comprising the steps of: receiving application parameters and a check-in code for the containerized application; generating a configuration file based on the application parameters, the configuration file containing configuration content including insert code; embedding the insert code into the check-in code; dynamically provisioning an opinionated pipeline based on contents of the configuration file, the opinionated pipeline including the plurality of stages with the associated development tools; setting up one or more control gates in one or more of the plurality of stages; receiving customized code for the containerized application, the customized code representing modifications of the insert code; and packaging the containerized application to include code contents of the check-in code, the customized code, and the insert code; wherein the containerized application is submitted for deployment to one or more environment platforms upon satisfying the one or more control gates or the containerized application is restricted from the subsequent deployment based on failure of the one or more control gates.

11 Claims, 8 Drawing Sheets

(56) References Cited

U.S. PATENT DOCUMENTS

| | | | | |
|---|---|---|---|---|
| 2018/0349610 | A1* | 12/2018 | Gupta | G06F 9/5077 |
| 2021/0232388 | A1* | 7/2021 | Mirantes | G06F 8/71 |
| 2022/0334832 | A1* | 10/2022 | Mirantes | G06F 8/60 |
| 2023/0297369 | A1* | 9/2023 | Mirantes | G06F 8/71 717/121 |
| 2023/0319112 | A1* | 10/2023 | Kaimal | H04L 63/20 726/1 |

OTHER PUBLICATIONS

Mohammad, Sikender Mohsienuddin, "Streamlining DevOps automation for Cloud applications," IJCRT, 2018, 5pg. (Year: 2018).*
Sanders et al., "Devsecops System Assurance," CMU, 2021, 8pg. (Year: 2021).*

* cited by examiner

DEVELOPMENT AND IMPLEMENTATION OF CONTAINERIZED APPLICATIONS

TECHNICAL FIELD

The present disclosure is directed at development of containerized applications in cloud based environments.

BACKGROUND

Increasingly, network applications and services are deployed on "cloud" infrastructures. In many cloud infrastructures, a third-party "cloud provider" owns a large pool of physical hardware resources (e.g., networked servers, storage facilities, computational clusters, etc.) and leases those hardware resources to users for deploying network applications and/or services.

Cloud infrastructures enable many benefits both for the software administrators and for the hardware owners (i.e., cloud providers). Software administrators can specify and lease computing resources (i.e., virtual machines) matching their exact specifications without up-front hardware purchase costs. The administrators can also modify their leased resources as application requirements and/or demand changes. Hardware owners (i.e., cloud providers) also realize substantial benefits from cloud infrastructures. The provider can maximize hardware utilization rates by hosting multiple virtual machines on a single physical machine without fear that the applications executing on the different machines may interfere with one another. Furthermore, the ability to easily migrate virtual machines between physical machines decreases the cloud provider's hardware maintenance costs. For these reasons, even large companies that own substantial hardware resources (e.g., search engine companies, social networking companies, e-commerce companies, etc.) often deploy those hardware resources as private clouds.

As the demand for cloud computing has grown, so has the number of cloud computing providers. Different cloud providers often offer different qualities of service, different pricing, and/or other distinctive features that make those particular providers more desirable for one purpose or another. Accordingly, some organizations lease resources from multiple cloud providers. Unfortunately, the interfaces to different providers often differ and managing multiple deployments on multiple clouds has become a problem for many organizations.

Current application development teams had access to numerous third-party DevOps tools that together enables the automation of code integration and deployment. While these DevOps tools and resulting pipelines can provide rapid delivery, teams still face numerous development challenges, such as: required access, understanding, management, and maintenance of multiple complex and disparate systems. While current development tools can automate many foundational technical aspects of the software development lifecycle, teams are still required to perform a significant number of manual steps in order to adhere to organizational business processes and controls. Further, current development frameworks provide for quality and security testing into later stages. As well, individual teams typically encounter redundant audit and compliance work requirements.

As such, it is recognized that new technology platforms can be introduced frequently to help with changing development team needs, however upskilling and resources required for each team to build and deploy their applications and meet the standards and controls required for each platform is significant. SA such, upskilling required in today's DevOps customization environments can be problematic due to the lack of by standardization of the enablement process relevant to platforms, technologies, and practices. It is recognized that new controls requires time investment from teams to adapt them which increase the lead time to deliver the products to market. Further, it is clear that changes to onboarding processes are needed to automate the repetitive manual steps in current DevOps environments.

SUMMARY

It is an object of the present invention to provide a system and method for development of a containerized application that obviates or mitigates at least one of the above presented disadvantages.

A first aspect provided is a method for developing a containerized application using a pipeline platform consisting of a plurality of stages with associated development tools, the method comprising the steps of: receiving application parameters and a check-in code for the containerized application; generating a configuration file based on the application parameters, the configuration file containing configuration content including insert code; embedding the insert code into the check-in code; dynamically provisioning an opinionated pipeline based on contents of the configuration file, the opinionated pipeline including the plurality of stages with the associated development tools; setting up one or more control gates in one or more of the plurality of stages; receiving customized code for the containerized application, the customized code representing modifications of the insert code; and packaging the containerized application to include code contents of the check-in code, the customized code, and the insert code; wherein the containerized application is submitted for deployment to one or more environment platforms upon satisfying the one or more control gates or the containerized application is restricted from the subsequent deployment based on failure of the one or more control gates.

A second aspect provided is a system for developing a containerized application using a pipeline platform consisting of a plurality of stages with associated development tools, the system comprising: one or more computer processors in communication with a memory storing a set of executable instructions for execution by the computer processor to: receive by an application interface application parameters and a check-in code for the containerized application; generate a configuration file based on the application parameters, the configuration file containing configuration content including insert code; embed the insert code into the check-in code; dynamically provision by an orchestration engine an opinionated pipeline based on the configuration code, the opinionated pipeline including a plurality of stages with associated development tools; set up by a control engine one or more control gates in one or more of the plurality of stages; receive customized code for the containerized application, the customized code based modifications to the insert code; and package the containerized application to include the check-in code, the customized code, and the insert code; wherein the containerized application is submitted for deployment to one or more environment platforms upon satisfying the one or more control gates or the containerized application is restricted from the subsequent deployment based on failure of the one or more control gates.

BRIEF DESCRIPTION OF THE DRAWINGS

In the accompanying drawings, which illustrate one or more example embodiments.

THE DETAILED DESCRIPTION

Figure 1:
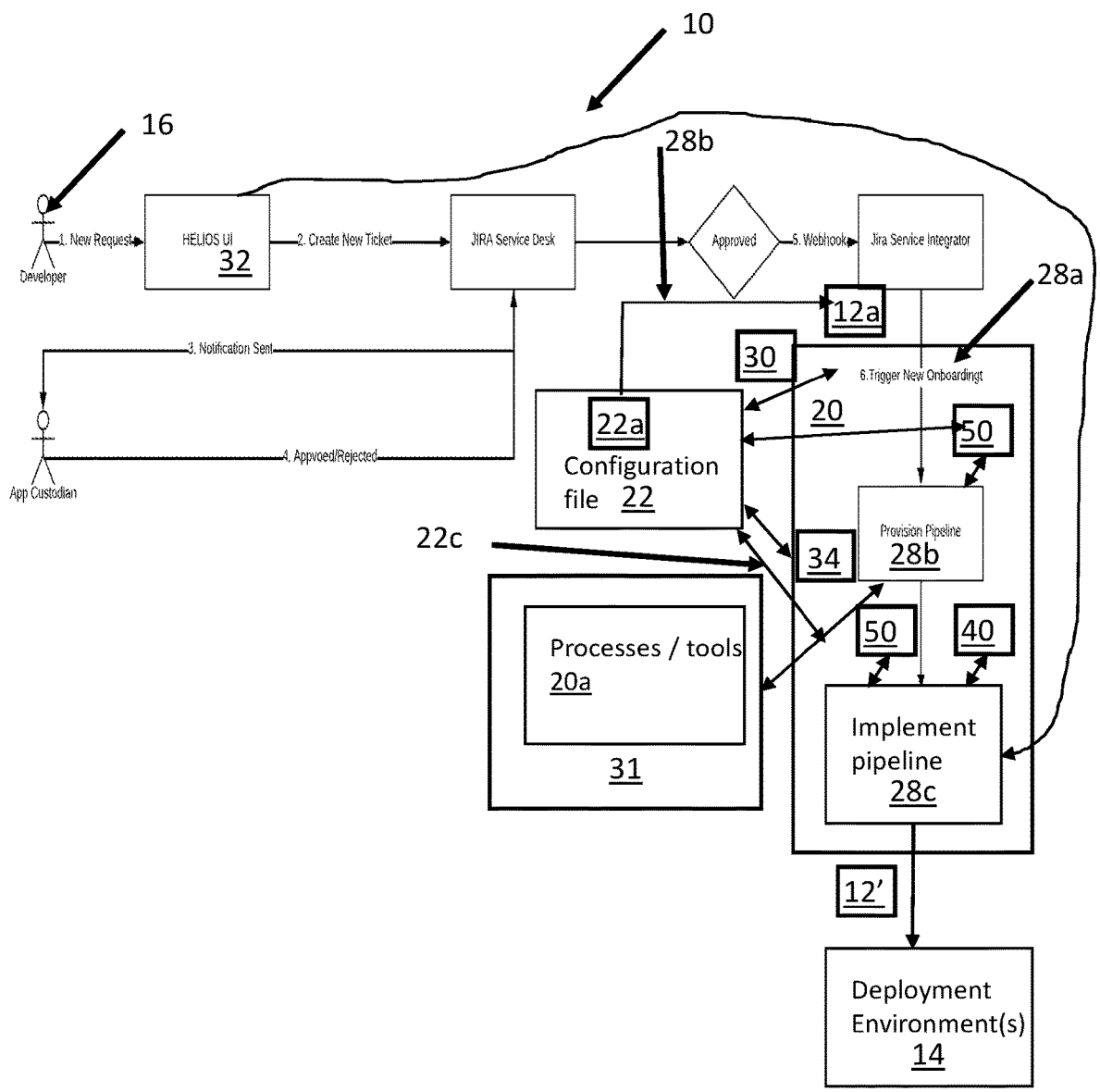
FIG. 1 depicts an example system for developing and maintaining containerized applications.
Figure 3:
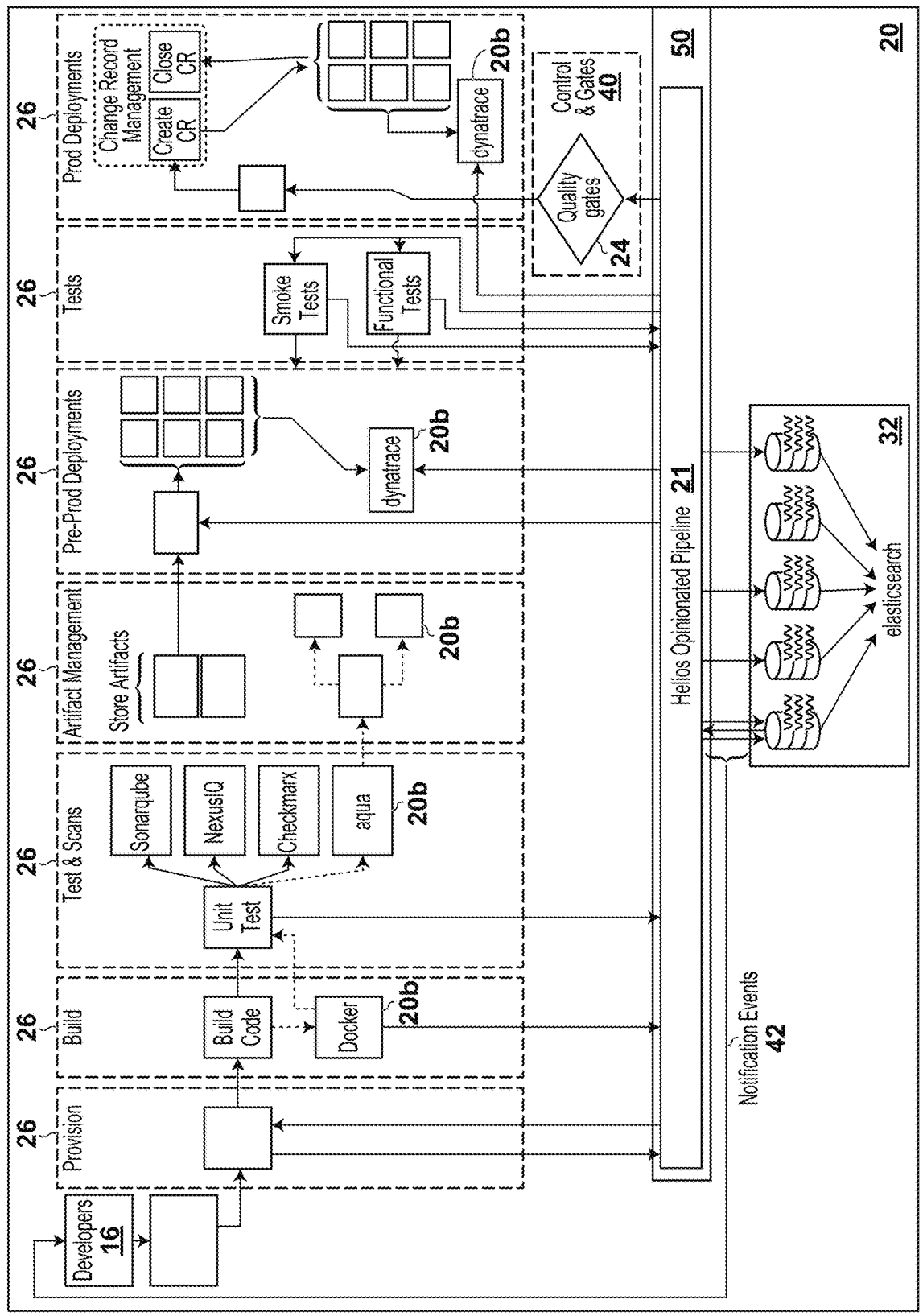
FIG. 3 represents an example opinionated pipeline of the system of FIG. 1.

Referring to FIGS. 1 and 3, shown is an application development and deployment system 10 for developing and deploying a containerized application 12 (including code 12a) to a cloud environment 14. One advantage of the system 10 is that it provides a platform 20 where application development teams 16 can deploy their application 12 to multiple cloud environments 14 concurrently. As such, it is recognized that each application 12 can be developed on a dynamically generated pipeline framework 20 for subsequent deployment in the environment(s) 14. It is recognized that the pipeline framework 20 (a dynamically generated DevOps pipeline 21) is configured 22c (via a configuration file 22) as a set of automated application development processes and tools 20b (selected from a set 31 of available tools and processes) that facilitates both developers 16 and operations professionals 16 to work cohesively to build and deploy their application 12. The DevOps pipeline 21 (see FIG. 3) can include various stages 26 such as but not limited to: build automation/continuous integration, automation testing, validation, and reporting. The DevOps pipeline 21 also interacts with one or more controls/gates 24 (having a plurality of different gates 24a,b,c) that require navigation (e.g. approval, exception, etc.) before the application 12 is allowed to be deployed. As such, the pipeline 21 can be referred to as an opinionated pipeline 21, which one provisioned, provides for a continuous integration and continuous deployment (CI/CD) mechanism, as an automated series of steps that are performed in order to deliver a (e.g. new version) of application software 12. The pipeline 21 can be dynamically provisioned 28b by an orchestration engine 50, such that the orchestration engine 50 generates 28b a respective pipeline 21 for each application 12, based on its respective configuration file 22. Further, the engine 50 can be used to operate/implement the pipeline 21, once provisioned, including communication with the application interface 32 via the notifications 42 (see FIG. 3).

Figure 5:
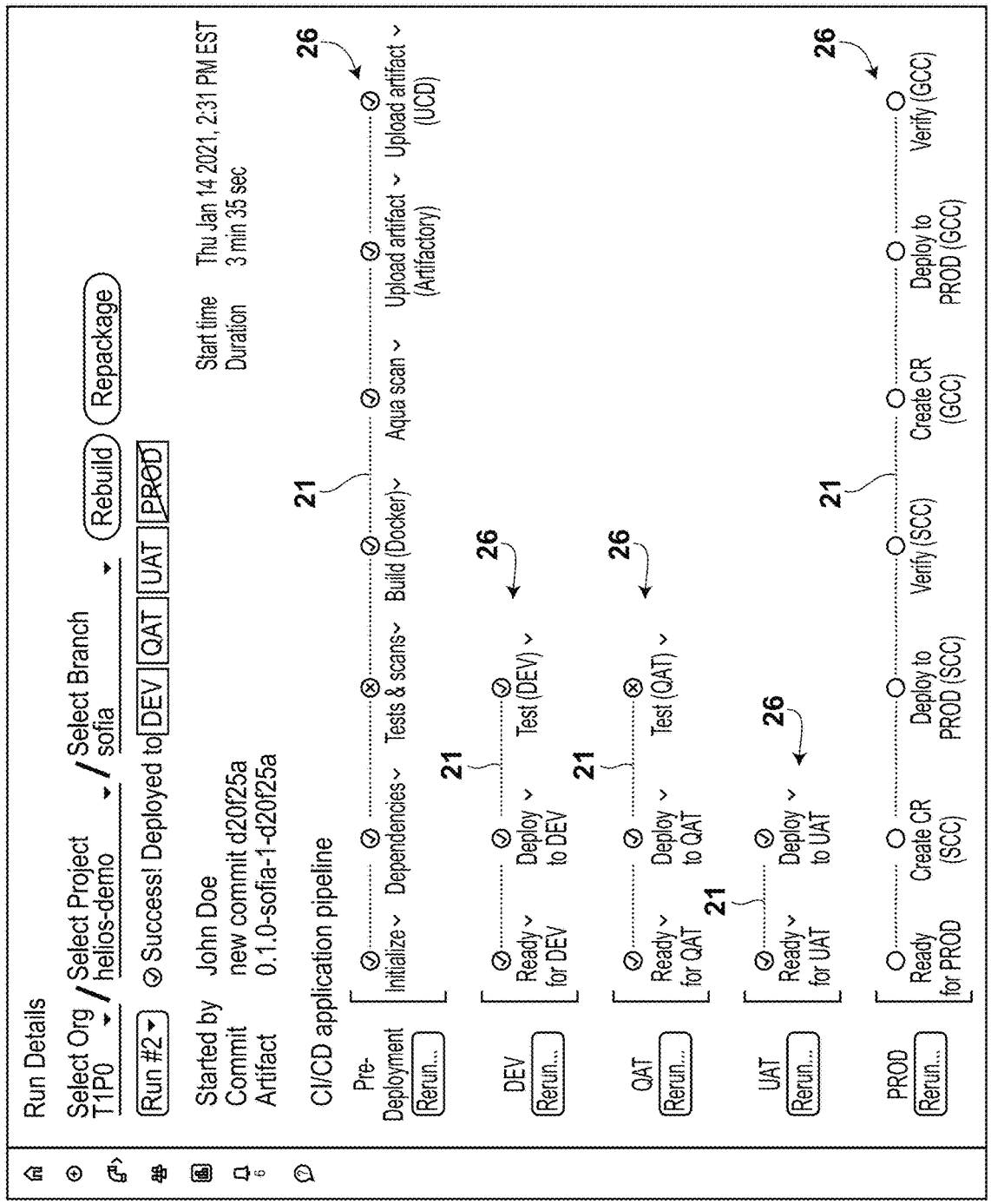
FIG. 5 depicts an example application interface of the system of FIG. 1.

As further described below, the configuration file 22 content 22a (e.g. code templates) is incorporated 28b as part of the code 12a (see FIG. 2) and is also used in the provisioning of the pipeline 21 (e.g. setup and ordering of appropriate processes and tools 20b for the specified application 12 as defined in an onboarding process 28a). In other words, each pipeline 21 is dynamically generated for a particular application 12, based on application parameters 30 (e.g. specified platform, specified security requirements, specified functionality, etc.) provided by the developer 16 during the onboarding process 28a via an application interface 32. An example user interface 32a of the application interface 32 is shown in FIG. 5. Configuration file content 22a can also be referred to as insert code 22a.

Referring again to FIGS. 1 and 2, the developer 16 accesses an application (e.g. submission) interface 32 facilitating the submission (e.g. check-in) of the application code 12a. Further, the interface 32 receives from the developer 16 a plurality of application parameters 30 during the onboarding process 28a. The application parameters 30 are used to populate configuration content 22a of the configuration file 22, as well as to dynamically structure the content and order of the pipeline 21, using those processes and tools 20a as appropriately selected from the set 31 based on the configuration file 22. It is also recognized that any updates to the application parameters 30 can be used to augment the contents 22a of the configuration file 22 and/or the contents of the code 12a, as desired. It is also recognized that the configuration content 22a can be based on organizational application policy (e.g. security) content 34, which can be incorporated into the configuration file 22 and thus affect the content 22a (which is inserted into the code 12a) as well as the type and order of the development processes and tools 20b which are used to provision the pipeline 21 (i.e. those selected from the set 31). The content 22a of the configuration file 22 can include code options and use cases, which can be further developed/modified by the developer 16 as the customized content 22b. The configuration content 22a can include (e.g. code) content related to application features such as but not limited to program language, user interface configuration, business unit operational/process/feature differences, etc.

In view of the above, it is recognized that the pipeline 21 is dynamically generated (by the platform 20) as a result of the imported code 12a, the parameters 30 selected/specified by the developer 16 (e.g. development team) and/or the organizational application policy content 34. It is further recognized that any differences in the code 12a, configuration content 22a and/or organizational application policy content 34 could result in changes to the structure of the content and order of the processes/tools 20b in the pipeline 21. In this manner, the generation and use of the configuration file 22 is done uniquely for each application 12 that is input in to the system 10 (e.g. via the submission interface 32).

Figure 2A:
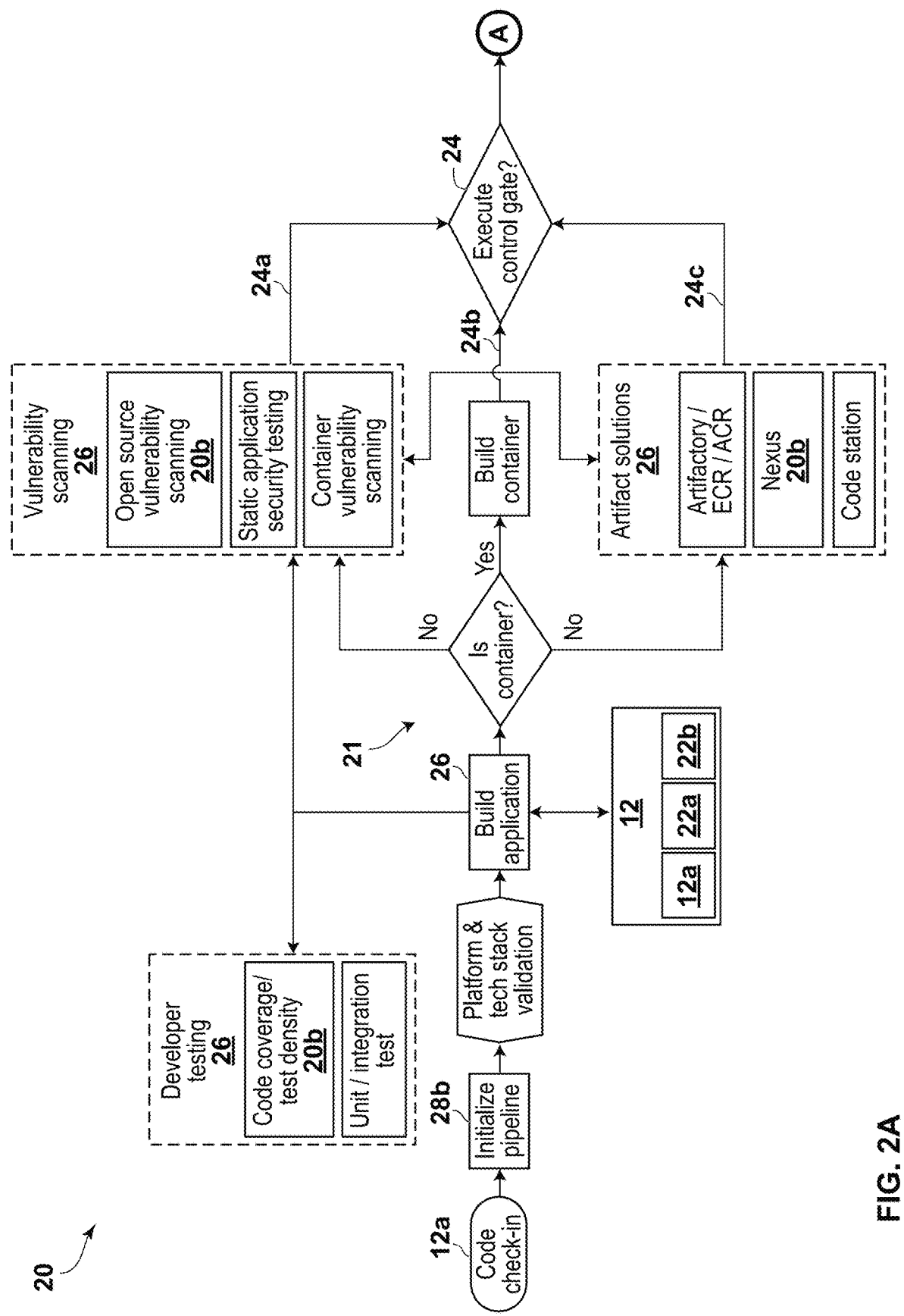
FIG. 2 represents an example workflow for development of containerized applications using the system of FIG. 1.
Figure 2B:
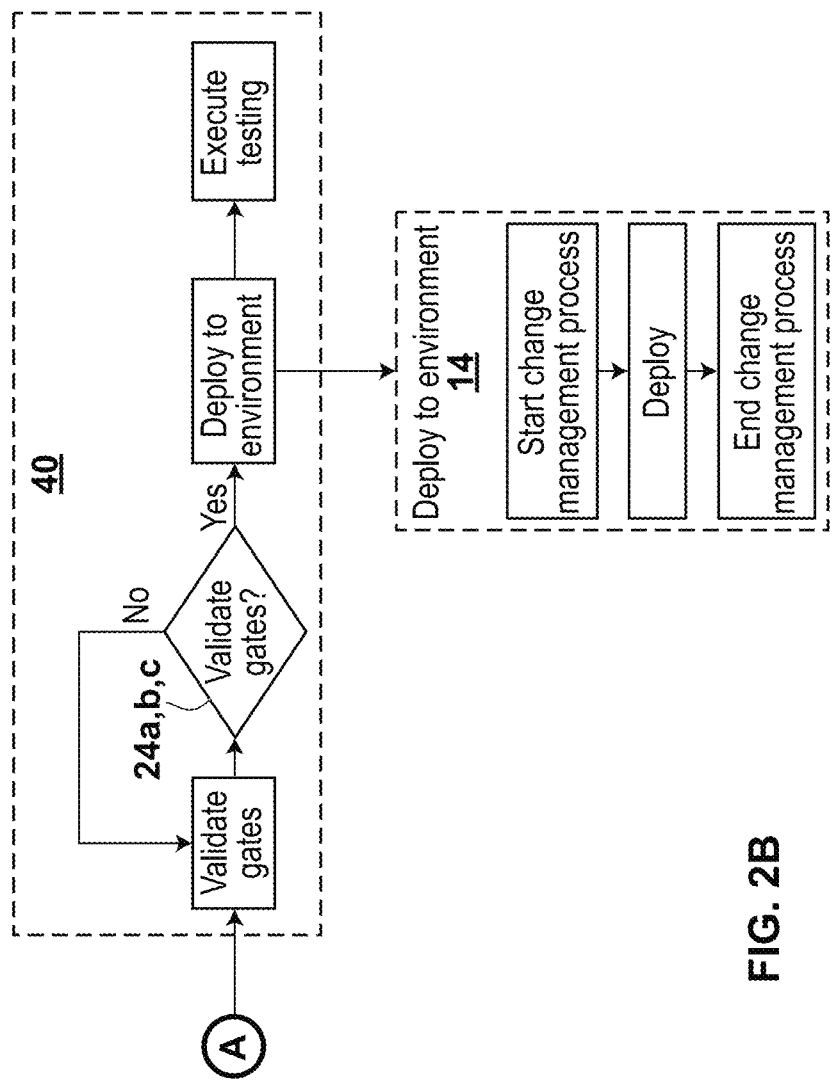

As shown in FIG. 1, the platform 20 has the main components of onboarding 28a, pipeline provisioning 28b and pipeline implementation 28c. FIG. 2 provides an example workflow of the platform 20 for the pipeline implementation 28c. FIG. 3 provides an example configuration of the tools/processes 20b for the pipeline 21, based on a particular configuration file 22 associated with the respective application 12 under development. In this manner, each pipeline 21 is built 28b and implemented 28c for a specified application 12, resulting from the onboarding process 28a. In other words, the code 12a check-in and onboarding process 28a associated therewith are used to generate the configuration file 22 as well as provision 28b the pipeline 21. It is this one to one relationship between the configuration file 22 and the pipeline 21 that facilitates setup and operation of the controls/gates 24 (see FIG. 3) specific (e.g. gate types 24a,b,c) to the application 12 under development, as further discussed below. It is recognized that the onboarding process 28a can be repeated for different versions of the application 12. In this manner, each of the versions of the application 12 gets its own respective configuration file 22 and thus own unique associated dynamically generated pipeline 21.

Referring again to FIG. 2, shown are various different gate types 24a,b,c, depending upon the contents 22a of the configuration file 22 inserted into the code 12a (e.g. different gate types 24*a,b,c* can be specified for different environments 14 such as distributed, mainframe, virtual machine, etc. as part of the onboarding process 28*a* and subsequent configuration file 22 generation). Also as shown, there are various example stages 26 of the pipeline 21, e.g. Build Application, Vulnerability Scanning, Artifact Solutions, Developer Testing, Delivery, Deployment, etc. As can be seen in the Delivery stage 26, the gates 24 are enforced such that failure at a gate 24 results in the restriction of the application 12 from subsequent deployment to the environment 14. It is recognized that during the build stage 26, the developer 16 has the ability to modify the content 12*a*, 22*a* of the application 12, thereby generating customized content 22*b* of the original content 22*a*, for example while accessing the processes and tools 20*b* of the pipeline 21 via the interface 32 during the implementation 28*c*. In this manner, the application 12 will contain the code 12*a*, the configuration content 22*a* as well as any customization content 22*b* (i.e. selected portion of the content 22*a* modified by the developer 16 during the development of the application 12 via the pipeline 21). As such, the application 12 can be considered to include the code 12*a*, the configuration content 22*a* and the customization content 22*b*.

It is recognized that an advantage of using the configuration file 22 to insert configuration content 22*a* into the code 12*a* is that the developer 16 can customize 22*b* the inserted content 22*a* to result in a built application 12 that is in line with the intentions of the original check-in code 12*a*. In this manner, the developer 16 has the freedom to develop/build their application 12 using their check-in code 12*a* and the configuration content 22*a* as a basic application development starting point. Further, the dynamically generated pipeline 21 (as populated using appropriate processes and tools 20*b* selected from the set 31—as per the configuration file 22) provides a guide by which the development and eventual deployment of the application 12 can be facilitated. However, the specification and implementation of the gates 24 in the pipeline 21 facilitates control of the customized content 22*b*, to make sure that the customized content 22*b* still abides by or is otherwise compatible with the policy content 34. For example, the control gates 24, as further described below, are used to make sure that the customized content 22*b* satisfies a customization criterion (or criteria) 25 of the gate 24 (i.e. the customized content 22*b* still accords with the principles set out in the policy content 34). For example, policy content 34 related to security aspects of network communications/messaging protocols is checked by the gate 24*a*, making sure that the customized content 22*b* (e.g. code) meets the security standards/operational requirements 25 as defined in the policy content 34 related to messaging security. The entity of the pipeline 21 that implements the gate(s) 24 is a gate engine 40 (see FIG. 3).

The engine 40 can be responsible for (as directed by the engine 50) security controls orchestration, which can be referred to as how the opinionated pipeline 21 introduces security control scanning based on the application 12 type and the target environment the application 12 is deploying to. Further, the engine 40 can be referred to as gates & controls engine, by which controls (e.g. different gate types 24*a,b,c*) are dynamically added to the opinionated pipeline 21 in real-time and enforced (e.g. application content 12*a*, 22*a*,22*b* is checked against respective customization criterion (or criteria) 25 of the respective gate 24 type.

As such, the engine 50 can provide the orchestration mechanism of the platform 20, which has the task of automating the installation, scaling, and management of (e.g. containerized) workloads and services for the application 12. The engine 50 can provide application 12 management tasks such as scaling applications 12, rolling out new versions of the applications 12, and providing monitoring, logging and debugging of the applications 12, among other functions/services.

While every pipeline 21 is unique to a particular application 12, the set 31 of processes and tools 20*b*, the application interface 32 and the basic processes of onboarding 28*a*, pipeline provisioning 28*b* and pipeline implantation 28*c* can be common to each application 12 development and deployment within the platform 20. Further, as discussed in relation to the gates 24, the (e.g. each) steps of the pipeline 21 can be evaluated for success before moving on to the next stage 26 of the pipeline 21, as per implementation of the various gates 24*a,b,c*. In the event of a failure, the pipeline 21 can be used to send notification events 42 to the developer 16 (e.g. via the application interface 32), and thus provide feedback to the developer 16 for required changes to the content 12*a*, 22*a*, 22*b* of the application 12.

Figure 4:
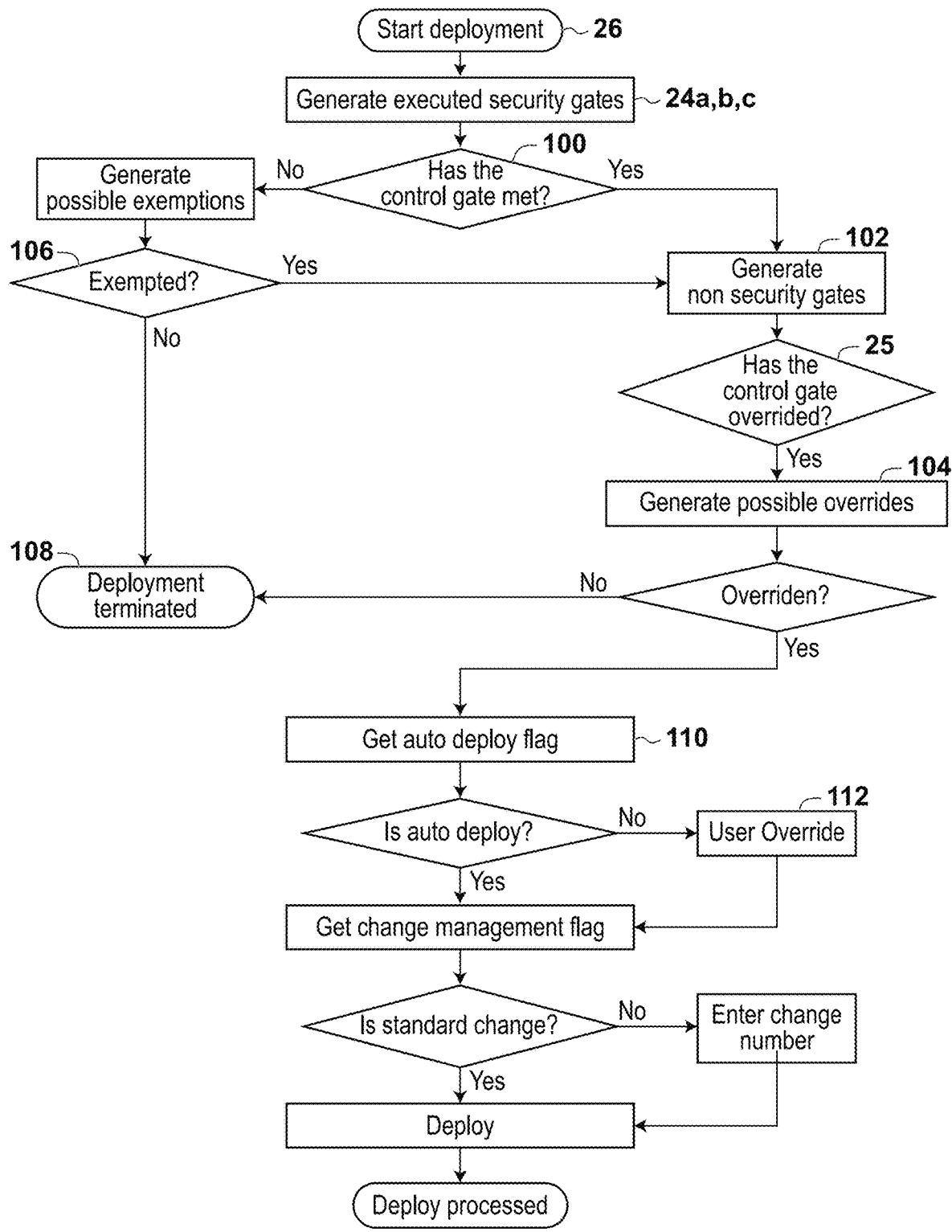
FIG. 4 represents an example workflow for control gates using the system of FIG. 1.

Referring to FIG. 4, shown is an example operation of the engine 40, based on a plurality of different gate types 24*a,b,c*, for example once a deployment stage 26 has started, in which exemptions 90 and/or overrides 92 can be used to mitigate in situations where the mandatory gate(s) 24 of the pipeline 21 have been failed by the application 12. For example, at step 100 the content 12*a*, 22*a*, 22*b* is checked against the criteria 25. At step 102 if the criteria has been met, then any further gates 24 (e.g. gate types) can be utilized to check the content 12*a*, 22*a*, 22*b* against the respective criteria 25. In this manner overrides 104 and/or exemptions 106 can be used in situations where the application 12 has failed a respective gate 24. The exemptions 106 and overrides 104 can be communicated to the pipeline 21 via the notifications 42 with the developer 16 and any respective QA, QE processes in communication with the application interface 32. If it is decided by the engine 40 that an override/exemption is unacceptable, then the deployment is terminated 108 and the developer 16 is notified 42. If allowed, then a deployment process 110 can be used (e.g. using deployment flags with possible additional override ability 112), resulting in the eventual deployment 114 of the application 12.

In view of the above, it is recognized that in the Control Gate 24 implementation of the engine 40, each platform (e.g. mainframe, virtual machine, public cloud, etc.) can have their own control gates 24 (as specified as per the parameters 30 selected and represented in the policy information 34—and thus provisioned 28*b* in the pipeline 21), such that gates 24 specified can be executed at each stage 26 and validated right before the deployment to an environment 14. Further, as discussed, each environment 14 via the policy information 34 (and for example as contained in the configuration file 22) can set mandatory gates 24 which can be exempted 106 or overridden 104, recognizing that only successful, exempted, and/or overridden gates 24 could allow the application 12 development to proceed to deployment 114. Further, it is recognize that this control gate 24 design is dynamic in the way that a control can be added to the platform 20, such that the environment 14 can define (via the criteria 25) if a particular control 24 can be overridden or not and by who.

Figure 6:
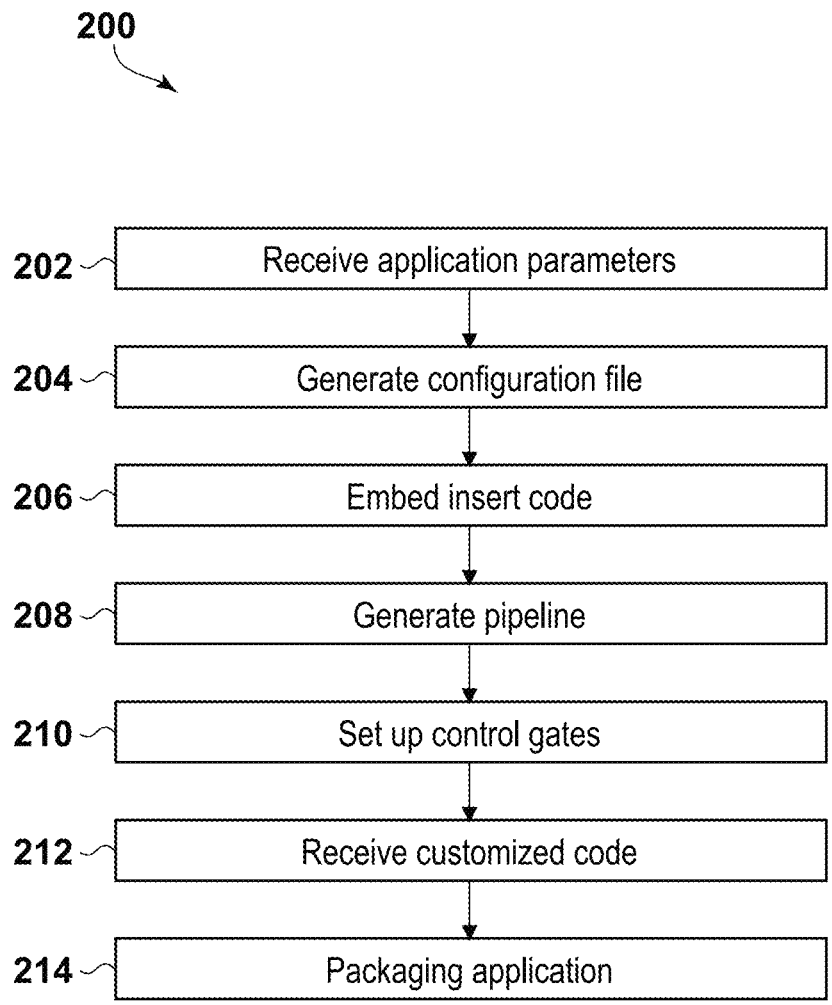
FIG. 6 shows an example operation of the system of FIG. 1.

Referring to FIG. 6, providing is an example operation 200 of the system of FIG. 1. At step 201, for developing a containerized application 12 using a pipeline platform 20 consisting of a plurality of stages 26 with associated development tools 20*b*, receiving application parameters 30 and a check-in code 12*a* for the containerized application 12; at step 204 generating a configuration file 22 based on the application parameters 30, the configuration file 22 containing configuration content including insert code 22a; at step 206 embedding the insert code 22a into the check-in code 12a; at step 208 dynamically provisioning an opinionated pipeline 21 based on contents of the configuration file 22, the opinionated pipeline 21 including the plurality of stages 26 with the associated development tools 20b; at step 210 setting up one or more control gates 24 in one or more of the plurality of stages 26; at step 212 receiving customized code 22b for the containerized application 12, the customized code 22b representing modifications of the insert code 22a; and step 214 packaging the containerized application 12 to include code contents of the check-in code 12a, the customized code 22b, and the insert code 22a; wherein the containerized application 12 is submitted for deployment to one or more environment platforms 14 upon satisfying the one or more control gates 24 or the containerized application 12 is restricted from the subsequent deployment based on failure of the one or more control gates 24.

Given the above, it is recognized that operation of the system 10 can provide for developers 16 having the choice between building custom pipelines and leveraging the system 10 as the DevOps-as-a-Service platform 20, which dynamically generates the pipelines 21. It is recognized that institutions that are solely reliant on a custom pipeline model can spend more time and money on refactor, tech currency, maintenance, and support of their DevOps pipelines. On the contrary, the system 10 facilitates standardize continuous application delivery and security through a single platform 20 which can removes this burden from individual app dev teams 16. The system 10 also has the advantage of providing audit and compliance directives right into the pipelines 21 on behalf of the app dev teams 16, via the control gates 24. This can facilitate the governing bodies (e.g. such as OSFI and US Fed interfaces) as policy content 34 directly with the platform 20 and product team 16.

The platform 20 of the system 10 can also facilitate multi-cloud 14 portability for the containerized applications 12. The system 10 can effectively host and manage applications 12 in the infrastructure via the application interface 32, for example by abstracting hardware differences between different environment platforms 14 such as but not limited to Azure, AWS, Openshift, VMWare, Mainframe and Pivotal Cloud Foundry deploy applications, in a consistent form factor and manner (e.g. for delivering software applications 12 for different type of mainframe, non-cloud, and cloud platforms 14). AS discussed above, one advantage of the system 10 is the control gates 24 and their implementation by the controls engine 50, such that dynamic control gates 24 can be used to enforces policies 34 and provide a way to get short-term exemptions for safety and quality of the application 12, which can be managed by various partners to enforce controls (e.g. by updating the policy content 34, which affects the contents of the generated configuration files as well as the set up and operation of the associated control gates 24). The system 10 also advantageously shares events and data, via the application interface 32, to be consumed by anyone to understand their roles or maturity of their applications 12 (i.e. progression within as well as downstream of the pipeline 21 post deployment).

For example, container applications 12 provide a standard way to package the application's code 12a, system tools, configurations, runtime, and dependencies (e.g. libraries) into a single object (i.e. container) as part of multiple file system layers. A container image as the application 12 is compiled from file system layers built onto a parent or base image. An application 12 can be embodied as the container image which is an unchangeable, static file (e.g. image) that includes executable code so the application 12 can run an isolated process on information technology (IT) infrastructure provided in the respective environment 14. Containers in general can share an operating system OS installed on the environment 14 server and run as resource-isolated processes, providing reliable, and consistent deployments, regardless of the environment. As such, containers encapsulate the application 12 as the single executable package of software 12 that bundles application code together with all of the related configuration files, libraries, and dependencies required for it to run. Containerized applications 12 can be considered "isolated" in that the container application 12 does not bundle in a copy of the operating system OS (e.g. underlying OS kernel) used to run the application 12 on a suitable hardware platform in the environment. Instead, an open source runtime engine (e.g. Kubernetes runtime engine) is installed on the environment's 14 host operating system and becomes the conduit for container applications 12 to share the operating system OS with other container applications 12 on the same computing system of the environment. As such, it is recognized that each respective environment 14 can have its own different respective operating system.

Example Computing System

Figure 7:
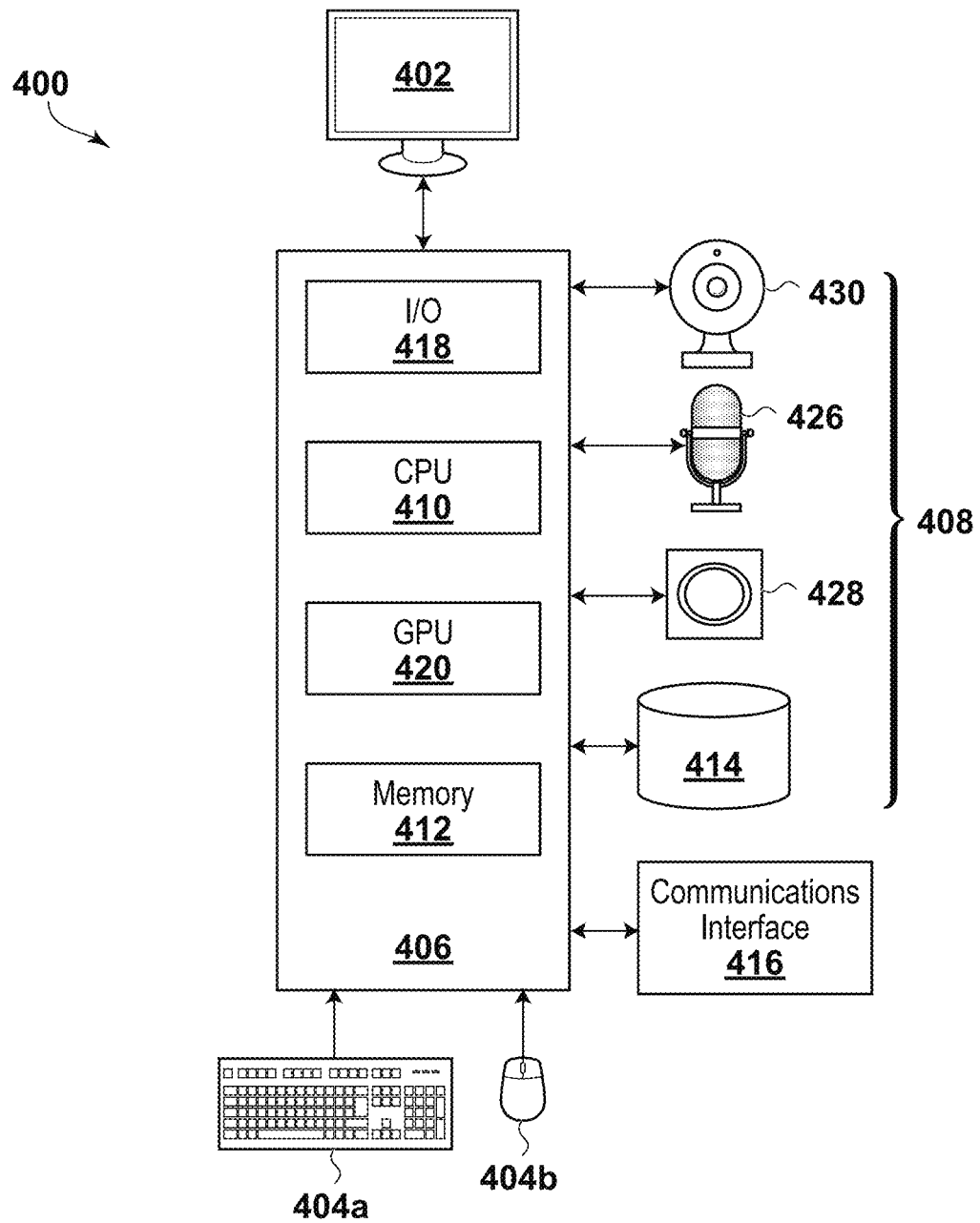
FIG. 7 depicts an example computer system that may be used to implement the network nodes of FIG. 1.

An example computer system in respect of which the technology herein described may be implemented is presented as a block diagram in FIG. 7, for example in implementing engines 40, 50 and/or the application interface 32. The example computer system is denoted generally by reference numeral 400 and includes a display 402, input devices in the form of keyboard 404A and pointing device 404B, computer 406 and external devices 408. While pointing device 404B is depicted as a mouse, it will be appreciated that other types of pointing device, or a touch screen, may also be used.

The computer 406 may contain one or more processors or microprocessors, such as a central processing unit (CPU) 410. The CPU 410 performs arithmetic calculations and control functions to execute software stored in a non-transitory internal memory 412, preferably random access memory (RAM) and/or read only memory (ROM), and possibly additional memory 414. The additional memory 414 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 7, or both.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 414 for execution by the one or more processors or microprocessors to effect the development and deployment of the applications 12 on the platform 20, such that each application 12 gets its own pipeline 21 (as generated and managed by the engine 50) and its own gates 24 (as generated and managed by the engine 40).

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404A, external devices 408 and other such components of the computer system 400. The computer 406 also includes a graphical processing unit (GPU) 420. The latter may also be used for computational purposes as an adjunct to, or instead of, the (CPU) 410, for mathematical calculations.

The external devices 408 can include a microphone 426, a speaker 428 and a camera 430. Although shown as external devices, they may alternatively be built in as part of the hardware of the computer system 400. The various components of the computer system 400 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems such as servers in communication with one another on a computer network. One example is where the network components 18,20,22,24,30 are in communication with one another on a communications network, such that each of the network components 32,40,50,20 are implemented on a computer system 400.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for developing a containerized application using a pipeline platform consisting of a plurality of stages with associated development tools, the method comprising the steps of:

receiving application parameters and a check-in code for the containerized application;

generating a configuration file based on the application parameters, the configuration file containing configuration content including insert code;

embedding the insert code into the check-in code;

dynamically provisioning an opinionated pipeline based on contents of the configuration file, the opinionated pipeline including the plurality of stages with the associated development tools;

setting up one or more control gates in one or more of the plurality of stages;

receiving customized code for the containerized application, the customized code representing modifications of the insert code; and packaging the containerized application to include code contents of the check-in code, the customized code, and the insert code;

wherein the containerized application is submitted for deployment to one or more environment platforms upon satisfying the one or more control gates or the containerized application is restricted from the subsequent deployment based on failure of the one or more control gates.

2. The method of claim 1, wherein the insert code includes configuration content selected from the group consisting of: policy content; security content; selected environment content, code option content, and use case content.

3. The method of claim 1, wherein the insert code is represented as code templates selected from a template library based on the application parameters.

4. The method of claim 1, wherein the plurality of stages is selected from the group consisting of: build; testing; validation; delivery; and deployment.

5. The method of claim 1 further comprising the step of checking at least a portion of the code contents by a gate engine by comparing the portion of the code content against a customization criterion.

6. The method of claim 5, wherein said comparing results in at least an exemption possibility or an override possibility of the customization criterion prior to gate approval of the portion of the code contents.

7. The method of claim 5, wherein the customization criterion is associated with policy content used to generate the configuration file.

8. The method of claim 7, wherein the policy content is related to security of network communication.

9. The method of claim 1, wherein the one or more control gates include a plurality of different gates types selectable from a gate library based on the configuration file.

10. The method of claim 9, wherein the type of control gate is associated with a selected environment platform defined by the application parameters.

11. A system for developing a containerized application using a pipeline platform consisting of a plurality of stages with associated development tools, the system comprising:

one or more computer processors in communication with a memory storing a set of executable instructions for execution by the computer processor to:

receive by an application interface application parameters and a check-in code for the containerized application;

generate a configuration file based on the application parameters, the configuration file containing configuration content including insert code;

embed the insert code into the check-in code;

dynamically provision by an orchestration engine an opinionated pipeline based on the configuration code, the opinionated pipeline including a plurality of stages with associated development tools;

set up by a control engine one or more control gates in one or more of the plurality of stages;

receive customized code for the containerized application, the customized code based modifications to the insert code; and package the containerized application to include the check-in code, the customized code, and the insert code;

wherein the containerized application is submitted for deployment to one or more environment platforms upon satisfying the one or more control gates or the containerized application is restricted from the subsequent deployment based on failure of the one or more control gates.

* * * * *